Feb. 14, 1950

J. R. MOORE 2,497,092

TRANSMITTER-RECEIVER CONNECTIONS IN RADIO
OBJECT LOCATING SYSTEMS

Filed Feb. 12, 1945

*INVENTOR.*
JAMES R. MOORE

BY William D. Hall.

ATTORNEY

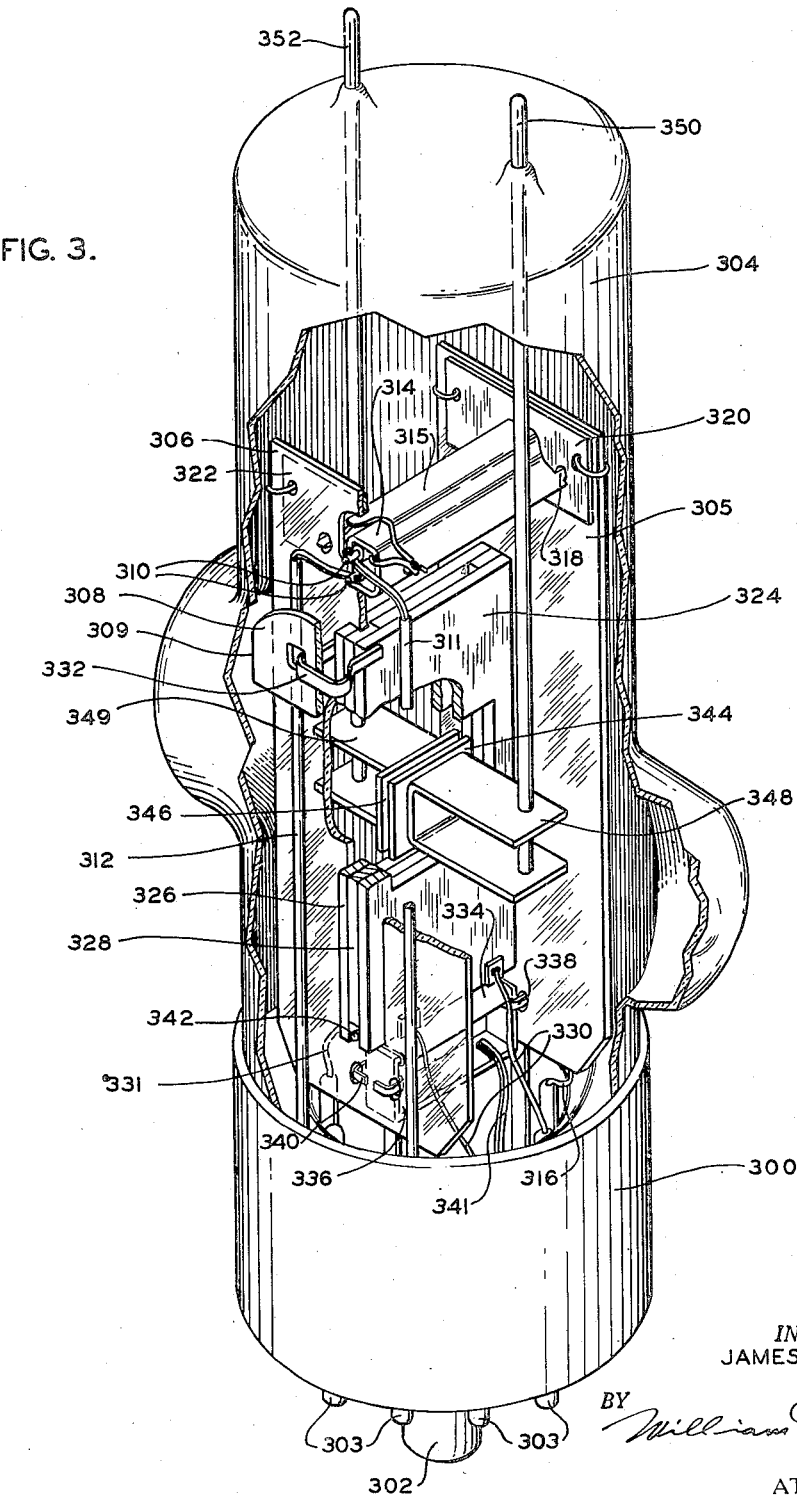

Patented Feb. 14, 1950

2,497,092

UNITED STATES PATENT OFFICE 2,497,092

TRANSMITTER-RECEIVER CONNECTIONS IN RADIO OBJECT-LOCATING SYSTEMS

James R. Moore, Princeton, N. J.

Application February 12, 1945, Serial No. 577,393

4 Claims. (Cl. 250—13)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio object-locating systems and, more particularly, to the circuits and electronic devices which are capable of protecting receivers during the transmitting cycle, the transmitter-receiver combination being connected to a common antenna, so that the latter acts as a transmitting antenna during the transmission of the exploratory pulses, and a receiving antenna intercepting the echo signals during the receiving cycles.

In the systems of this kind powerful exploratory pulses of high frequency energy are directionally radiated, and the objects in the path of this radiation possessing reradiating properties reflect this energy, resulting in the reception of echoes by the radar receivers which detect the U. H. F. signals, transform them into video signals, and the video signals are used for producing visual indications of these echoes on the screens of suitable oscilloscopes. These indications are used for obtaining range, azimuth, and elevation of the objects producing them.

It is a well-established practice in radar to use one antenna for transmitting, as well as for receiving the signals, because it results in the most economical and light-weight units. The use of a single antenna creates a new problem: that of protecting the receiver from a high intensity signal impressed on a common transmission line during the transmitting cycle. If no special means are provided to isolate the sensitive receiver from the powerful exploratory pulses, the receiver may be destroyed or damaged by the transmitted signals. Moreover, arc-overs are apt to occur in the receiving channel thus partially shorting the transmission line interconnecting the antenna with the transmitter, which obviously results in the parasitic loss of energy during the transmitting cycles.

Certain known methods of protecting the receivers in the system of this type involve the use of protective "spark gaps" connected across the tuned stubs or trombones connected to the transmission line which transform the input impedance of the receiver into a high impedance circuit during the transmitting cycle, and into a low impedance circuit during the receiving cycle. This mode of protecting the receivers is not free of certain disadvantages which are outlined in my application for patent, S. N. 467,270, filed November 28, 1942, now Patent No. 2,480,872, granted September 9, 1949. In the above mentioned application a novel system is disclosed for protecting the receivers which employs a special cathode ray beam tube in such a manner that it acts as a converter as well as an effective protector of the receivers during the transmitting cycle, the protective features residing in the fact that the cathode ray tube acts as a limiter of the signal impressed on the intermediate frequency channels of the receiver. The above mentioned system functions quite well if the potentials impressed on the deflection plates of the cathode ray tube do not exceed a certain maximum voltage. However, when an exceptionally high voltage is impressed on the transmission lines, the voltage appearing across the deflection plates is sufficiently high to produce "flash-overs" across the plates along the outer envelope of the tube, thus partially shorting the transmission line and the receiver.

The present invention may be considered as an improvement of the invention disclosed in patent application 467,270. The improvement resides in the construction of the cathode-ray tube and its connections to the transmission lines in such a manner that the above mentioned "flash-overs" do not take place, even when the transmitted power reaches the maximum obtainable power with the currently available transmitters.

The above mentioned results are accomplished by constructing the cathode ray tube in such a manner that the high voltage portion of the quarter-wave length step-up transformer, used for connecting the cathode ray converter to a matching trombone, is inserted in the evacuated envelope of the converter, with the result that the high voltage appearing across the deflection plates is incapable of producing any "flashovers."

It is, therefore, the object of this invention to provide coupling circuits for the receiver in the radio-object-locating system using a common antenna for transmitting and receiving signals, the circuits including a converter so constructed that the high voltage part of the step-up transformer is placed in the vacuum envelope of the converter.

The novel features which are believed to be characteristic of the invention are set forth in the appended claims; the invention itself, however, both as to its organization and methods of operation, together with the further objects and advantages thereof, may best be understood by reference to the further description in connection with the accompanying drawings, in which:

Figure 3 is a partially sectionalized, perspective view of the converter tube.

Figure 1:
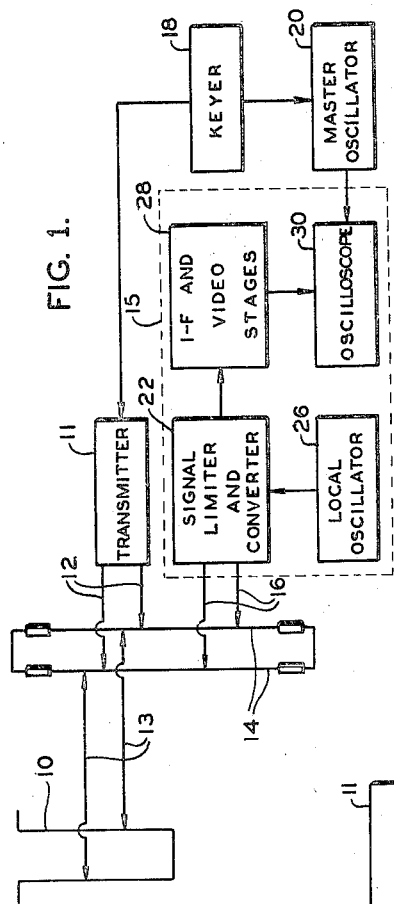
Figure 1 is a block diagram of the radio-object-locating system using a common antenna for transmitting exploratory pulses and for receiving the echoes.

Referring to Fig. 1, a common antenna 10 is connected to a transmitter 11 by means of transmission lines 12 and 13 through an impedance-matching trombone 14. A receiver 15 is also connected to antenna 10 by a step-up transformer 16 through trombone 14 and line 13. Transmitter 12 is keyed by a keyer 18, this keyer being connected to a master oscillator 20. Receiver 15 includes a signal limiter and converter 22, a local oscillator 26, the I. F. and video stages 28, an oscilloscope 30 for obtaining the desired visual indications of the received echoes. Oscilloscope 30 is also connected to a master oscillator 20 for synchronizing its sweep circuit with the transmitted signals.

The operation of the radio locator shown in Fig. 1 is as follows: keyer 18 modifies the sinusoidal wave impressed upon it by oscillator 20 into peaked pulses which are used for keying transmitter 11, the latter transmitting exploratory pulses by means of the directional antenna 10. The reflected signals or echoes are received by antenna 10 and are impressed on limiter and converter 22 where they are converted into I. F., and the latter is impressed on the I. F. and video stages 28 of the receiver. The transmitted pulse also appears in the receiver. The video signals either intensity-modulate or deflect the cathode ray beam of oscilloscope 30, thus producing visual indications of the signals on its screen. Since the sweep circuit is synchronized with the transmitter, the visual indications appear in proper time relationship on the oscilloscope screen.

Figure 2:
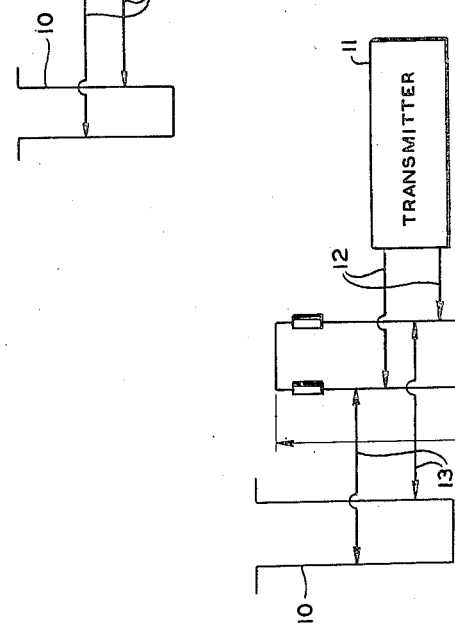
Figure 2 is a schematic diagram of the converter tube.
Figure 2:
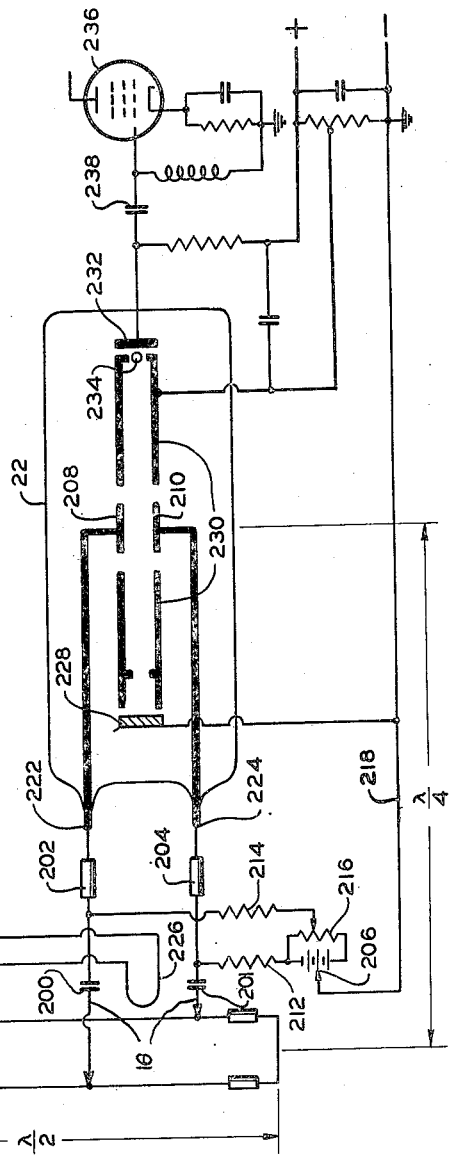

Referring now to Fig. 2, it discloses the schematic diagram of the connections between transmission line 13 and converter 22. Transmission line 13 is connected by means of the half-wave length matching trombone 14 to the quarter-wave length step-up transformer 16. Transformer 16 is provided with coupling condensers 200, 201 and adjustable length links 202, 204 which are used for adjusting the electrical length of the transformer. The condensers 200, 201 are used for isolating transformer 14 from a source of beam-centering potential 206 which is connected to the deflection plates 208, 210 of converter 22 through isolating resistances 212, 214 and a potentiometer 216. Source 206 is grounded by a conductor 218. Local oscillator 26 is inductively coupled to transformer 16 by means of a loop 226. Converter 22 comprises a beam tube converter described in U. S. Patent 2,294,659 to Edward W. Herold, of September 1, 1942, the construction of which has been modified as illustrated in Figs. 2 and 3. This tube comprises a cathode 228, an accelerating and focussing electrode 230, deflection plates 208, 210 and an anode 232. In the center of the aperture in the electrode 230, there is a rod 234 electrically connected to electrode 230. The operating characteristics of this tube are fully described in the above mentioned patent to Herold, and need not be repeated here. The deflection plates 208, 210 are connected to the step-up transformer 16, the electrical length of this transformer being adjusted by means of links 202 and 204 to the quarter-wave length of the wave used by the radio locator so that high voltage appears across the deflection plates of the converter. The larger part or length of this transformer is enclosed in the glass envelope of converter 22 so that the voltage appearing across terminals 222 and 224 cannot produce any flash-overs. The output of converter 22 is connected to an intermediate stage amplifier 236 through a condenser 238 and a coil 240, whose inductance and distributed capacitance act as a tuned circuit for the I. F. signal.

The operation of the system disclosed in Fig. 2 is as follows: the points of connections between the lines 12, 13 and trombone 14 are adjusted for obtaining maximum range. During this adjustment, transformer 16 is disconnected and, therefore, the maximum range adjustment is obtained by measuring the intensity of the field produced by antenna 10. Upon the completion of this adjustment, transformer 16 is connected to trombone 14, and the connections between the trombone and the transformer are adjusted for the maximum intensity of the received echoes. Since connecting of transformer 16 will have an effect on the connections of the transmission lines 12 and 13, they are readjusted once more for the maximum range, with the receiver remaining connected to trombone 14. Upon the completion of these adjustments, the system is ready for operation, transmitter 11 impressing high voltage signals on trombone 14 and antenna 10. These are stepped-up by transformer 16, thus impressing the amplified signal on the deflection plates 208 and 210 of the converter, causing the deflection of the cathode ray beam to its extreme positions. Since in its extreme deflection positions the beam will be deflected beyond the aperture openings in the electrode 230, the I. F. signal impressed on pentode 236 will be equal to zero. The cathode ray beam is focused normally on rod 234 with the result that anode 232 normally carries no current, except for a limited number of stray electrons which are not properly focused and, therefore, pass through the aperture of the converter. When the beam is deflected from its normal position to its extreme positions, there will be an instant when the entire electron beam will reach anode 232, at which instant the converter impresses maximum current on pentode 236. This maximum current is sufficiently low so as to prevent any injury of the receiver during the sending cycle of transmitter 12. The echoes are impressed on the deflection plates in exactly the same manner as the transmitted signal, except that their intensities are sufficiently low so as to operate the converter on its normal conversion characteristic, i. e., the beam is deflected to the right and left of rod 234 without reaching electrode 230.

Referring to Fig. 3, it discloses the structural features of converter 22. It includes a base 300 provided with the base-centering key 302 and pins 303, the pins being connected with the heater elements, a cathode, an accelerating and focussing electrode, and an anode of the tube. A properly evacuated glass envelope 304 is connected to base 300. A mica-frame 305, 306 properly centered in the evacuated envelope of the tube by means of mica spacers 308 (only one of the spacers 308 is visible in the figure, the other spacer being behind mica-frame 305), which are so proportioned as to lean against the inner glass wall of the envelope with their side edges 309, thus holding the entire tube assembly in fixed relationship with respect to the envelope. The heater elements 310 are connected to pins 303 by means of rods 311, 312 and the cathode 314 is connected to one of pins 303 through a cathode shield 315 and a rod 316 (see bottom right corner of the envelope), rods 316 being connected to a tongue 318 of shield 315. Shield 315 is supported by the frame members 305, 306, the members being reinforced in the upper portion by the metallic plates 320, 322. The accelerating and focussing electrode consists of two metallic plates 324, 326 which are spaced from each other by a third metallic spacer plate 328, the spacer plate being provided with the appropriate apertures, as illustrated in Fig. 2. The plates 324, 326 and 328 are electrically connected to several pins in the base of the tube by conductors 330 and 331. These plates are held in fixed position with respect to the mica-frame by means of slots in the mica members 305, 306, and brackets 332 connecting these plates to the mica spacers 308 (only one bracket 332 is visible in the figure). An anode 334 is held in fixed relationship with respect to the frame members 305, 306 and electrode plates 324, 326 and 328 by a metallic, rectangular bracket 336 which is attached to the frame members by clips 338 and 340. The anode is connected to one of the pins 303 by a conductor 341. Centrally located between the plates 324, 326, and approximately on the level with the lower edges of these plates, a rod 342 is positioned in front of anode 334, rod 342 being electrically connected to the focussing electrode plates 324, 326. Rod 342 corresponds to rod 234 in Fig. 2, and is used for intercepting the cathode ray beam when no signal is impressed on the deflection plates 344, 346 of the converter. The deflection plates 344 and 346 are connected by means of the U-shaped metallic brackets 348 and 349 to the metallic rods 350, 352 which hold them in fixed position with respect to the focussing electrode. The focussing electrode plates 324, 326 and 328 are provided with the rectangular openings for accommodating the deflection plates, as illustrated in the figure. The electrical length of the combination including connecting rods 350, 352 and deflection plates 346 is adjusted to be less than the quarter-wave length of the signal used for operating the radio locator, this length being determined by the minimum length of the outside connections necessary for connecting converter 22 to trombone 14. The protruding portions of the rods 350, 352 correspond to the terminals 222, 224 illustrated in Fig. 2, and are used for connecting the converter to the impedance-matching trombone 14, as illustrated in Figs. 1 and 2. The advantages of the converter disclosed in Fig. 3 reside in the fact that the high voltage portion of the step-up transformer is now located in the vacuum envelope of the converter so that the flash-overs previously encountered with the converters of this type have now been eliminated. The cathode 314 has been positioned in the upper portion of the evacuated vessel so that the I. F. connections between the anode and the outside circuits may be made with the conductors of minimum length, this conductor in Fig. 3 being conductor 341.

It is believed that the construction and operation of the radio locator and especially the input circuit of the receiver, together with the construction and operation of the converter, as well as the advantages thereof, will be apparent from the foregoing description. It should be understood that while the invention has been shown in one preferred form, reasonable changes and modifications may be made without departing from the spirit of the invention.

I claim:

1. An ultra-high frequency radio system including a transmitter, a receiver, a common antenna connected to said transmitter and to said receiver, an impedance-matching network interconnecting said transmitter, antenna, and said receiver, a cathode-ray-beam detector tube having an outer envelope and comprising an input circuit of said receiver, said tube including two beam-deflecting plates within said envelope, and a tuned-line, step-up transformer comprising two conductors mounted within said envelope, said conductors connected respectively to said deflecting plates at one end and to said network at the other end.

2. An ultra-high frequency radio system including a transmitter, a receiver, a common antenna connected to said transmitter and to said receiver, an impedance-matching network interconnecting said transmitter, antenna, and said receiver, a cathode-ray-beam detector tube including a base, an evacuated glass envelope connected to said base at its lower end, a frame made of insulating material and including two substantially parallel deflection plates mounted within said envelope, an anode supported by the lower end of said frame, a beam-forming, apertured electrode comprising three, stacked, and electrically connected plates, the central plate of said electrode being provided with a plurality of aligned, rectangularly-shaped apertures for forming and focusing said beam, the last of said apertures being in front of said anode and provided with a metallic member longitiudinally bisecting said aperture, said deflection plates fitting into an aperture in the substantially central portion of said three plates, a tuned-line, step-up transformer comprising two conductors mounted within said envelope, one end of said conductors being connected to and supporting said deflection plates, the other end being connected to said impedance-matching network, the longitudinal axes of said conductors being substantially parallel to the longitudinal axis of said frame, the upper ends of said conductors protruding through the upper end of said envelope, and a cathode element mounted above, and aligned with, the upper aperture of said beam-forming electrode.

3. An ultra-high frequency radio system as defined in claim 2, in which the electrical length of said conductors, including said deflection plates, is greater than one-eighth of the wave-length of the carrier wave impressed on said conductors.

4. An ultra-high frequency radio system as set forth in claim 1, wherein the electrical length of said conductors, including said beam-deflecting plates, is approximately equal to a quarter of an operating wave-length of said transmitter.

JAMES R. MOORE.

REFERENCES CITED

The following references are of record in the file of this patent:

UNITED STATES PATENTS

| Number | Name | Date |
| --- | --- | --- |
| 1,510,341 | Proctor | Sept. 30, 1924 |
| 2,262,406 | Rath | Nov. 11, 1941 |
| 2,262,407 | Rath | Nov. 11, 1941 |
| 2,287,296 | Dallos | June 23, 1942 |
| 2,295,315 | Wolff | Sept. 8, 1942 |
| 2,401,717 | Wolff et al. | June 4, 1946 |
| 2,419,696 | Smith | Apr. 29, 1947 |